(12) United States Patent
Oh et al.

(10) Patent No.: US 12,196,254 B2
(45) Date of Patent: Jan. 14, 2025

(54) AIR FOIL BEARING AND METHOD FOR MANUFACTURING THE SAME

(71) Applicants: Hyundai Motor Company, Seoul (KR); Kia Corporation, Seoul (KR); Kookmin University Industry Academy Cooperation Foundation, Seoul (KR)

(72) Inventors: Byung Hwa Oh, Yongin-si (KR); Tae Young Kim, Suwon-si (KR); Tae Ho Kim, Seongnam-si (KR); Sung Ho Hawng, Seoul (KR); Doo San Baek, Seoul (KR)

(73) Assignees: Hyundai Motor Company, Seoul (KR); Kia Corporation, Seoul (KR); Kookmin University Industry Academy Cooperation Foundation, Seoul (KR)

( * ) Notice: Subject to any disclaimer, the term of this patent is extended or adjusted under 35 U.S.C. 154(b) by 126 days.

(21) Appl. No.: 17/993,530

(22) Filed: Nov. 23, 2022

(65) Prior Publication Data

US 2023/0417276 A1 Dec. 28, 2023

(30) Foreign Application Priority Data

Jun. 27, 2022 (KR) .................. 10-2022-0078440

(51) Int. Cl.
*F16C 17/02* (2006.01)
*F16C 33/12* (2006.01)
*F16C 43/02* (2006.01)

(52) U.S. Cl.
CPC .......... *F16C 17/024* (2013.01); *F16C 33/125* (2013.01); *F16C 43/02* (2013.01); *F16C 2226/30* (2013.01); *F16C 2226/36* (2013.01); *F16C 2226/40* (2013.01); *F16C 2226/52* (2013.01)

(58) Field of Classification Search
CPC ...... F16C 17/024; F16C 33/125; F16C 43/02; F16C 2226/30; F16C 2226/36; F16C 2226/40; F16C 2226/52
See application file for complete search history.

(56) References Cited

U.S. PATENT DOCUMENTS

| 5,427,455 A | * | 6/1995 | Bosley | ................... F16C 43/02 384/106 |
| 5,519,274 A | | 5/1996 | Scharrer | |
| 9,726,220 B2 | | 8/2017 | Kim | |

(Continued)

FOREIGN PATENT DOCUMENTS

| CN | 106594059 A | | 4/2017 |
| CN | 106763151 A | | 5/2017 |
| DE | 102017204761 A1 | * | 9/2018 |

(Continued)

OTHER PUBLICATIONS

JP2004263781A_Decription.*

*Primary Examiner* — Phillip A Johnson
(74) *Attorney, Agent, or Firm* — Fish & Richardson P.C.

(57) ABSTRACT

An air foil bearing includes a sleeve that defines a hollow portion having an irregular curvature, where the hollow portion is configured to receive a rotor, a bump foil that is disposed at an inner peripheral surface of the sleeve, and a top foil that is disposed at the bump foil.

19 Claims, 13 Drawing Sheets

(56) References Cited

U.S. PATENT DOCUMENTS

2003/0007706 A1     1/2003   Suh et al.
2017/0191522 A1     7/2017   Kim

FOREIGN PATENT DOCUMENTS

| | | | | |
|---|---|---|---|---|
| JP | H08-326749 | A | | 12/1996 |
| JP | 2000337359 | A | | 12/2000 |
| JP | 200112454 | A | | 1/2001 |
| JP | 2001227535 | A | | 8/2001 |
| JP | 2004263781 | A | * | 9/2004 |
| KR | 20040034614 | A | | 4/2004 |
| KR | 101558489 | B | | 10/2015 |
| KR | 20170031343 | A | * | 3/2017 |
| WO | WO-2020035208 | A1 | * | 2/2020 ........... F04D 29/057 |
| WO | WO-2020035210 | A1 | * | 2/2020 ........... F04D 29/057 |

\* cited by examiner

AIR FOIL BEARING AND METHOD FOR MANUFACTURING THE SAME

CROSS-REFERENCE TO RELATED APPLICATION

This application claims the benefit of priority to Korean Patent Application No. 10-2022-0078440, filed in the Korean Intellectual Property Office, on Jun. 27, 2022, the entire contents of which are incorporated herein by reference.

TECHNICAL FIELD

The present disclosure relates to an air foil bearing having a new structure, and a method for manufacturing the air foil bearing.

BACKGROUND

A bearing may be used as a configuration that supports a rotating body, such as a shaft, such that the rotating body is rotated, and various kinds of bearings, such as a ball bearing, a journal bearing, and an air foil bearing, may be used. In particular, the air foil bearing may be formed such that an air film is formed between a rotating body that is to be supported, and the air foil bearing, to support the rotating body. The air foil bearing has an advantage in aspects of durability, support ability, and management easiness, and thus may be widely applied to various industrial fields.

In some cases, when the rotating body is rotated such that the air flows and a pressure between the air foil bearing and the rotating body is changed, the top foil presses and deforms the bump foil having elasticity. When an external force is applied, the bump foil may have an elastic structure, a shape of which is changed reversibly.

In some cases, in order to fix the top foil and the bump foil, the top foil and the bump foil is welded to the inner peripheral surface of the air foil bearing or a separate fixing member is mounted. Furthermore, because a size and a shape of the sleeve of the air foil bearing are differently designed according to a kind of a rotating body, various production facilities may be used.

SUMMARY

The present disclosure has been made to solve the above-mentioned problems occurring in the prior art while advantages achieved by the prior art are maintained intact.

An aspect of the present disclosure provides an air foil bearing that may be easily manufactured while a driving stability of an air foil bearing that supports and drives a rotating body is enhanced, and a method for manufacturing the air foil bearing.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an air foil bearing includes a sleeve having a hollow of an irregular curvature, through which a rotor passes, a bump foil seated in at least a partial area of an inner peripheral surface of the sleeve, and a top foil disposed on the bump foil.

The top foil may have an irregular curvature.

The bump foil may be configured such that bump heights thereof from the inner peripheral surface are different at least two specific locations, and may support the top foil.

The bump foil may include an area, in which the bump heights become gradually smaller along a rotational direction of the rotor.

The top foil may have the irregular curvature as it is disposed on the bump foil to cover the at least two specific locations to be supported at different heights at the at least two specific locations.

The air foil bearing may further include a plurality of protrusions protruding from the inner peripheral surface toward the hollow, and the at least a partial area may include an area corresponding to the inner peripheral surfaces of adjacent ones of the plurality of protrusions.

The inner peripheral surface may be divided into a plurality of curved surfaces by the plurality of protrusions, and at least two of the plurality of curved surfaces may have different curvatures.

The hollow may have an elliptical column shape.

When a width is defined along an elliptical peripheral direction of the inner peripheral surface, a portion of at least one of the plurality of protrusions, from the inner peripheral surface to a specific protrusion height, may have a first width and a portion thereof, which exceeds the specific protrusion height, may have a second width that is larger than the first width.

When a width is defined along an elliptical peripheral direction of the inner peripheral surface, a portion of at least one of the plurality of protrusions, from the inner peripheral surface to a specific protrusion height, may have a specific width, and a width of a portion thereof, which exceeds the specific protrusion height, may be larger than the specific width and may become larger as it becomes closer to a center of the hollow.

The sleeve may include a plurality of through-passages formed in an axial direction of the rotor around the hollow such that a fluid flows therethrough.

According to another aspect of the present disclosure, an air foil bearing includes a sleeve having a hollow, through which a rotor passes, a bump foil seated on an inner peripheral surface of the sleeve, and a top foil disposed on the bump foil, the sleeve includes a plurality of sleeve units stacked in a direction corresponding to an axial direction of the rotor, and each of the plurality of sleeve units includes a plate having a central hole corresponding to the hollow.

The central hole may have a shape having an irregular curvature, and the hollow has an irregular curvature.

Bump heights of the bump foil, from the inner peripheral surface of the sleeve, may be different at at least two specific locations of the inner peripheral surface.

Each of the plurality of sleeve units may include a plurality of bosses protruding from an inner peripheral surface of the plate toward the central hole, and defining recesses, by which the bump foil is stopped between the bosses and the inner peripheral surface.

The plate may include at least one through-hole distinguished from the central hole, and formed around the central hole, and the sleeve may include at least one through-passage, in which the sleeve units are stacked, and defining the at least one through-hole.

According to another aspect of the present disclosure, a method for manufacturing an air foil bearing includes preparing a plurality of sleeve units each including a plate having a central hole, through which a rotor passes, forming a sleeve having a hollow by stacking the plurality of sleeve units, seating a bump foil on an inner peripheral surface of the sleeve, and disposing a top foil on the bump foil.

The preparing of the plurality of sleeve units may include preparing the plurality of sleeve units through a process including at least one of etching, laser cutting, and press cutting.

The forming of sleeve may include forming the sleeve by coupling the plurality of sleeve units through a process using at least one of an adhesive member, laser welding, and a rivet.

The preparing of the plurality of sleeve units may include preparing the plurality of sleeve units such that a plurality of through-holes are formed around the central hole.

The forming of the sleeve may include forming the sleeve by stacking the plurality of sleeve units while fitting the plurality of through-holes with a plurality of rods included in a stacking jig.

The preparing of the plurality of sleeve units may include preparing the plurality of sleeve units such that a plurality of bosses protrude from an inner peripheral surface of the plate toward the central hole, the forming of the sleeve may include forming the sleeve by stacking the plurality of sleeve units such that the plurality of bosses are stacked to define a plurality of protrusions, and the seating of the bump foil may include seating the bump foil on the inner peripheral surface by moving the bump foil in a direction that is parallel to an axial direction of the hollow such that the bump foil is inserted between adjacent ones of the plurality of protrusions and recesses defined by the inner peripheral surface whereby bump heights of the bump foil from the inner peripheral surface are different at at least two specific locations.

The disposing of the top foil may include disposing the top foil on the bump foil such that the top foil covers the at least two specific locations whereby the top foil is supported at different heights at the at least two specific locations.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
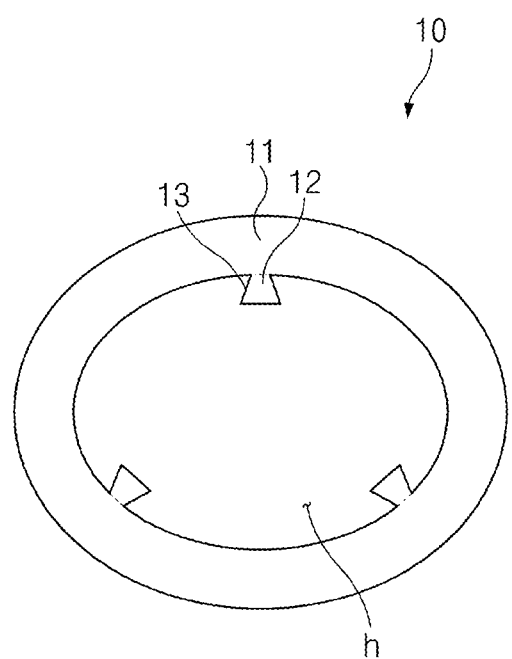
FIG. 1 is a view illustrating an example of a sleeve unit.

Hereinafter, some implementations of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

FIG. 1 is a view illustrating an example of a sleeve unit.

In some implementations, a sleeve unit 10 may include a plate 11. A central hole "H", through which a rotor "R" may pass, may be formed in the plate 11. The central hole "H" my have a shape having an irregular curvature. For example, the shape having the irregular curvature may be an elliptical shape and may be a shape including a plurality of areas having different curvatures, but the present disclosure is not limited thereto. For example, it may be a lobe shape, and the lobe shape may be a shape including a portion that protrudes from the plate 11 toward the central hole "H". Hereinafter, an elliptical shape will be described as an example for the shape having the irregular curvature, but the same or similar description may be applied to another shape having an irregular curvature.

The sleeve unit 10 may include a plurality of bosses 12. For example, the plurality of bosses 12 may protrude from an inner peripheral surface of the plate 11 toward the central hole "H". For example, when the central hole "H" is elliptical, the plurality of bosses 12 may be formed along an elliptical peripheral direction of the plate 11. When a width is defined along the inner peripheral surface of the plate 11, widths of the plurality of bosses 12 may become larger as they become closer to a center of the central hole "H". However, the present disclosure may not be limited thereto.

Although FIG. 1 illustrates that the plurality of bosses 12 are three bosses, this is an example and the number of the bosses 12 is not limited to a specific number.

The sleeve unit 10 may have recesses 13. For example, the recesses 13 may be formed between the inner peripheral surface of the plate 11 and the plurality of bosses 12.

The sleeve unit 10 may be formed through a process including at least one of etching, laser cutting, and press cutting of the plate (e.g., a metallic plate or a nonmetallic plate).

Hereinafter, a sleeve 100 formed by stacking a plurality of sleeve units 10 will be described with reference to FIG. 2.

Figure 2:
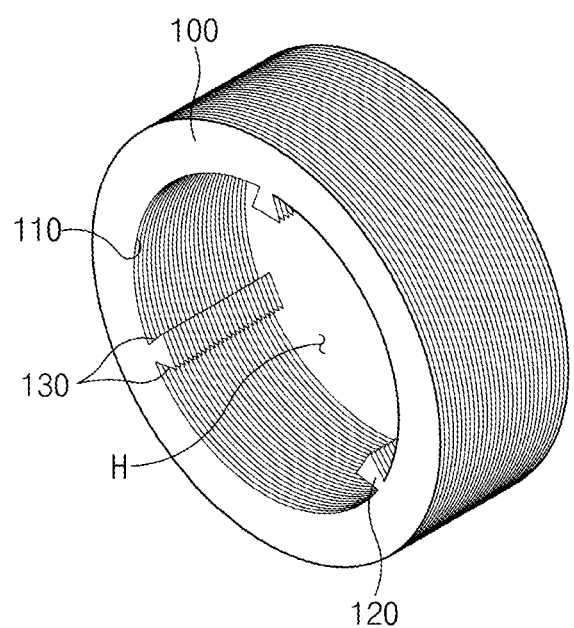
FIG. 2 is a perspective view illustrating an example of a sleeve.

FIG. 2 illustrates the sleeve.

The sleeve 100 may be formed (or prepared) by stacking the plurality of sleeve units 10. For example, the plurality of sleeve units 10 may be coupled to each other through a process using at least one of an adhesive member, laser welding, and a rivet. A stack structure of the sleeve 100 may be formed by coupling the plurality of sleeve units 10 to each other through the process using at least one of the adhesive member, the laser welding, and the rivet.

When the sleeve 100 is formed by stacking the plurality of sleeve units 10, the sleeve 100 corresponding to the rotor "R" of various shapes and sizes may be easily manufactured, and thus manufacturing easiness may be enhanced.

A hollow "H", through which the rotor "R" may pass, may be formed in the sleeve 100. The hollow "H" may have an irregular curvature, in a shape viewed in a stacking direction of the sleeve units 10. For example, the hollow "H" may have an elliptical column shape. In other words, the hollow "H" may be elliptical when viewed in a direction of a central axis of the hollow "H". However, the present disclosure may not be limited thereto.

The sleeve 100 may have an inner peripheral surface 110. For example, the inner peripheral surface 110 may be formed to surround the hollow "H".

The sleeve 100 may include a plurality of protrusions 120. For example, the plurality of protrusions 120 may protrude from the inner peripheral surface 110 of the sleeve 100 toward the hollow "H". When the hollow "H" has an elliptical column shape, the plurality of protrusions 120 may be formed along a direction that is perpendicular to an elliptical peripheral direction of the inner peripheral surface 110 of the sleeve 100. Furthermore, when a width is defined along the inner peripheral surface 110, widths of the plurality of protrusions 120 may become larger as they become closer to a center of the hollow "H". The plurality of protrusions 120 may be formed by stacking the plurality of bosses 12. However, the present disclosure may not be limited thereto.

The inner peripheral surface 110 may be divided into a plurality of curved surfaces by the plurality of protrusions 120. At least two of the plurality of curved surfaces may have different curvatures. For example, as illustrated, when the plurality of protrusions 120 are three protrusions, the inner peripheral surface 110 may be divided into three curved surfaces. At least two of the three curved surfaces divided by the three protrusions may have different curvatures.

The sleeve 100 may have recesses 130. For example, the recesses 130 may be formed between the inner peripheral surface 110 of the sleeve 100 and the plurality of protrusions 120.

Hereinafter, a bump foil 210 that may be seated in at least a partial area of the inner peripheral surface 110 of the sleeve 100 will be described.

Figure 3:
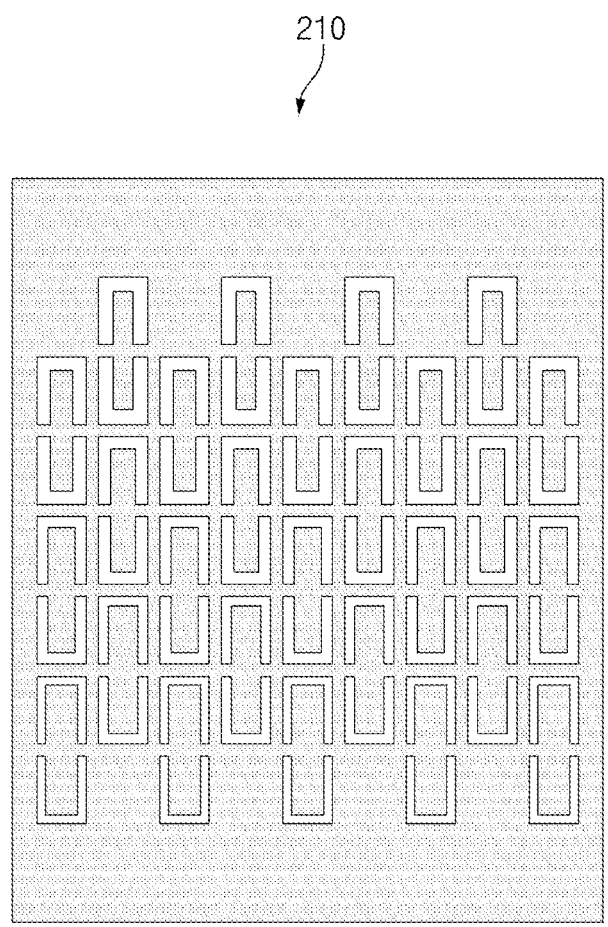
FIG. 3 is a plan view illustrating an example of a bump foil.

FIG. 3 illustrates the bump foil 210.

The bump foil 210 may have elasticity. For example, the bump foil 210 may include an elastic material that may be deformed reversely.

The bump foil 210 may include a sheet-shaped bump foil body.

The bump foil 210 may include a plurality of bump foil legs. For example, the plurality of bump foil legs may protrude from the bump foil body toward the inner peripheral surface 110 of the sleeve 100 to support the bump foil body against the inner peripheral surface 110. The heights of the at least two of the plurality of bump foil legs, from the inner peripheral surface 110 of the sleeve 100 may be different. The heights of the plurality of bump foil legs may become gradually higher or gradually lower along the inner peripheral surface 110.

In a detailed description with reference to FIG. 3, as the plurality of bump foil legs are defined inside a cutting line that cuts the bump foil body in a C shape that is opened in a specific direction, they are connected to the bump foil body at distal ends thereof in the specific direction and are separated from the bump foil body at portions thereof, except for the distal ends, to be curved toward the inner peripheral surface.

The bump foil 210 may not be limited to the above-described shape. For example, the bump foil 210 having elasticity may be folded a plurality of times, and thus the height of thereof may become higher or lower along a specific direction (e.g., a direction of the inner peripheral surface 110) when it is disposed on a surface (e.g., the inner peripheral surface 110).

Hereinafter, an implementation, in which the bump foil 210 and a top foil 220 are seated on the inner peripheral surface 110 of the sleeve 100, will be described with reference to FIGS. 4 and 5.

Figure 4:
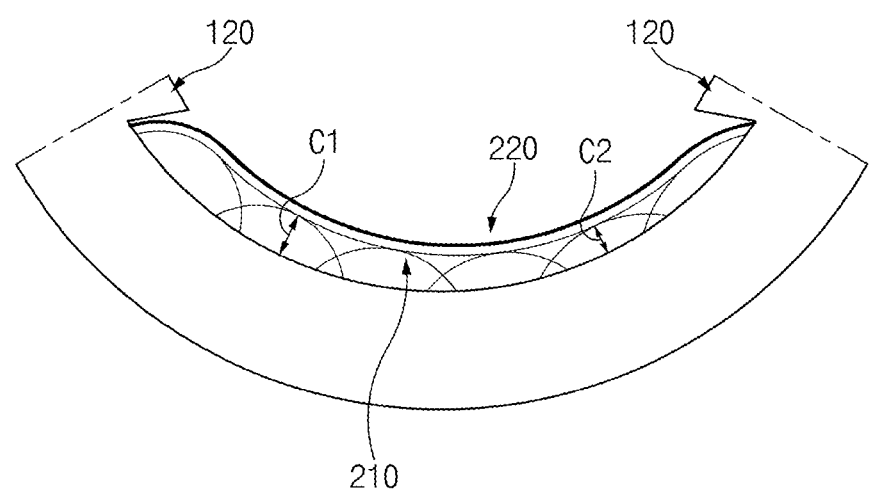
FIG. 4 is a side view illustrating an example of a sleeve, on which a bump foil and a top foil are seated.
Figure 5:
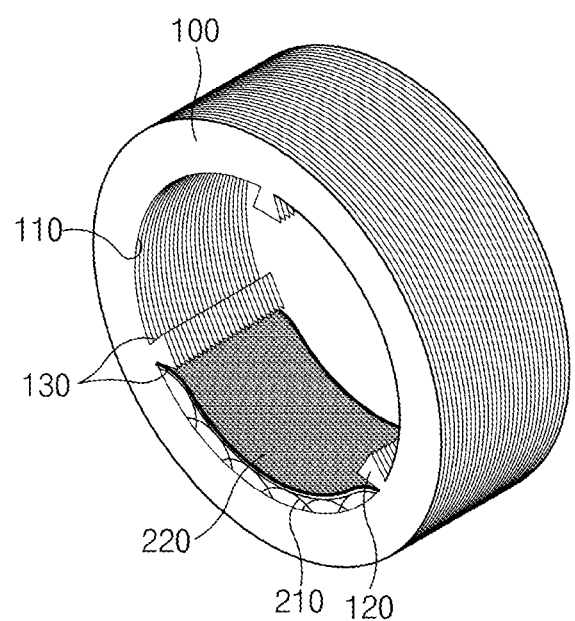
FIG. 5 is a perspective view illustrating an example of a sleeve, on which a bump foil and a top foil are seated.

FIG. 4 illustrates a side view of the sleeve, on which the bump foil 210 and the top foil 220 are seated. FIG. 5 illustrates a perspective view of the sleeve, on which the bump foil 210 and the top foil 220 are seated.

An air foil bearing 1 may include the sleeve 100 having the hollow "H", through which the rotor "R" may pass. The hollow, for example, may have an elliptical column shape, but the present disclosure is not limited thereto. The bump foil 210 and the top foil 220 may be seated on the inner peripheral surface 110 of the sleeve 100. Hereinafter, structures of the bump foil 210 and the top foil 220 seated on the inner peripheral surface 110 will be described.

In a description of the structure of the sleeve 100, the description of the sleeve 100 of FIG. 2 may be applied.

The bump foil 210 may be seated in at least a partial area of the inner peripheral surface 110. For example, the at least a partial area may include an area corresponding to the inner peripheral surface 110 between adjacent ones of the plurality of protrusions 120. Furthermore, the at least a partial area may include at least one of the plurality of curved surfaces divided by the plurality of protrusions 120.

The bump foil 210 may be seated between adjacent ones of the plurality of protrusions 120, and the recesses 130 defined by the inner peripheral surface 110 such that heights (or bump heights) thereof from the inner peripheral surface 110 at at least two specific locations are different. For example, the bump foil 210 may be seated between adjacent recesses 130 such that the heights of the inner peripheral surface 110 becomes smaller or larger along a direction of the inner peripheral surface 110 (e.g., an elliptical peripheral direction when the hollow "H" has an elliptical column shape). The bump foil 210 may have different heights C1 and C2 at at least two specific locations on an area of the inner peripheral surface 110, on which the bump foil 210 is disposed.

The bump foil 210 may be inserted between the recesses 130 and be seated. For example, the bump foil 210 may be moved in a direction that is parallel to an axial direction of the hollow "H" and may be seated on the inner peripheral surface 110 between the recesses 130.

The bump foil 210 may include an area, in which the heights thereof from the inner peripheral surface 110 along a rotational direction of the rotor "R" become gradually smaller or larger when the rotor "R" is rotated while passing through the hollow "H".

The top foil 220 may be disposed on the bump foil 210. For example, the top foil 220 may be supported by the bump foil 210 seated on the inner peripheral surface 110 such that the heights (or the bump heights) thereof are different at at least two specific locations. The top foil 220 may have an irregular curvature as it is supported by the bump foil 210.

The top foil 220 may be seated between adjacent ones of the plurality of protrusions 120 and the recesses 130 defined by the inner peripheral surface 110.

Due to the above-described disposition, the bump foil 210 and the top foil 220 may be seated on one or more of the plurality of curved surfaces of the inner peripheral surface 110 divided by the plurality of protrusions 120.

When the rotor "R" is installed in the hollow "H", the top foil 220 may define an inclined surface as it is seated on the above-described bump foil 210.

Hereinafter, an implementation, in which the rotor "R" is rotated in the air foil bearing 1 having the above-described structure, will be described with reference to FIGS. 6 and 7.

Figure 6:
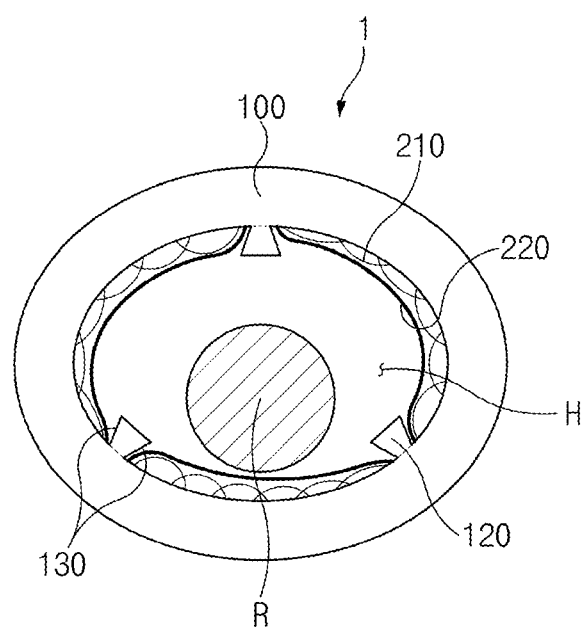
FIG. 6 is a side view illustrating an example of a rotor disposed in an example of an air foil bearing.

FIG. 6 is a side view illustrating a state, in which the rotor "R" is disposed in the air foil bearing 1. FIG. 7 illustrates a state, in which the rotor "R" is disposed in the air foil bearing 1 to be driven.

Referring to FIG. 6, when the rotor "R" is not rotated in a state, in which the rotor "R" is accommodated in the hollow "H" of the air foil bearing 1, the rotor "R" may be located on the top foil 220 due to the gravitational force.

When the rotor "R" starts to be rotated and reaches an angular speed for initial floating or more, the rotor "R" may start to float. When the angular speed, by which the rotor "R" is rotated, is a threshold angular speed or more, the rotor "R" may be rotated in an area corresponding to a center of the hollow.

Figure 7:
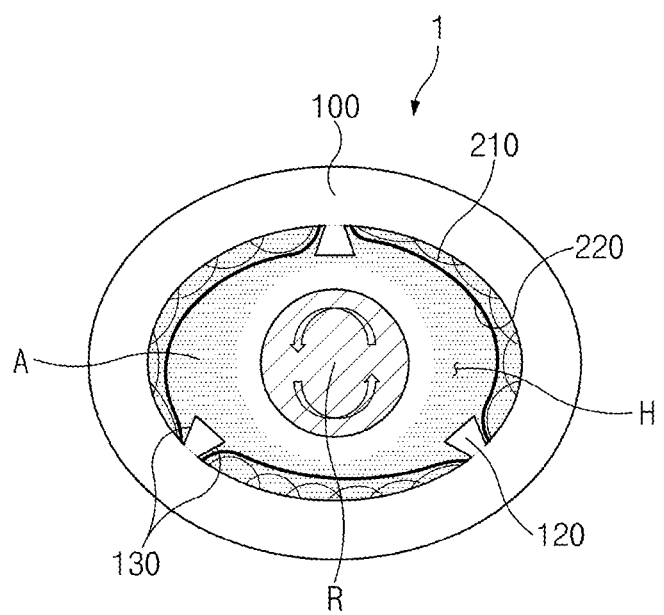
FIG. 7 is a side view illustrating an example of a rotor disposed and driven in an example of an air foil bearing.

When the rotor "R" is rotated as in FIG. 7 in a state, in which the rotor "R" is not rotated as in FIG. 6, an air film "A", by which ambient air is rapidly circulated, may be formed between the rotor "R" and the air foil bearing 1. A dynamic pressure of the air film "A" may support the rotated rotor "R".

A maximum dynamic pressure due to the rotation of the rotor "R" may be formed at a distal end of the inclined surface of the top foil 220. A maximum dynamic pressure when the top foil 220 is supported by the bump foil 210 such that the curvature is not constant or the inclined surface is formed may be higher than a maximum dynamic pressure when the heights of the bump foil 210 from the inner peripheral surface 110 is constant.

Furthermore, an inclination of the inclined surface of the top foil 220 is larger when the hollow "H" of the irregular curvature (e.g., the elliptical column shape) is formed in the air foil bearing 1 than when the cylindrical hollow is formed.

When the top foil 220 is supported by the bump foil 210 such that the curvature is not constant or the inclined surface is formed so that the hollow "H" of the irregular curvature is formed in the air foil bearing 1, the dynamic pressure generated by the circulated air becomes stronger, and thus the maximum dynamic pressure is maximized together with driving stability thereof. Furthermore, because the air film "A", by which the air foil bearing 1 supports the rotor "R", is formed faster, a time for the initial floating of the rotor "R" may be shortened.

Furthermore, an amount of circulated air between the air foil bearing 1 and the rotated rotor "R" becomes larger and thus a cooling effect may be exhibited.

Figure 8:
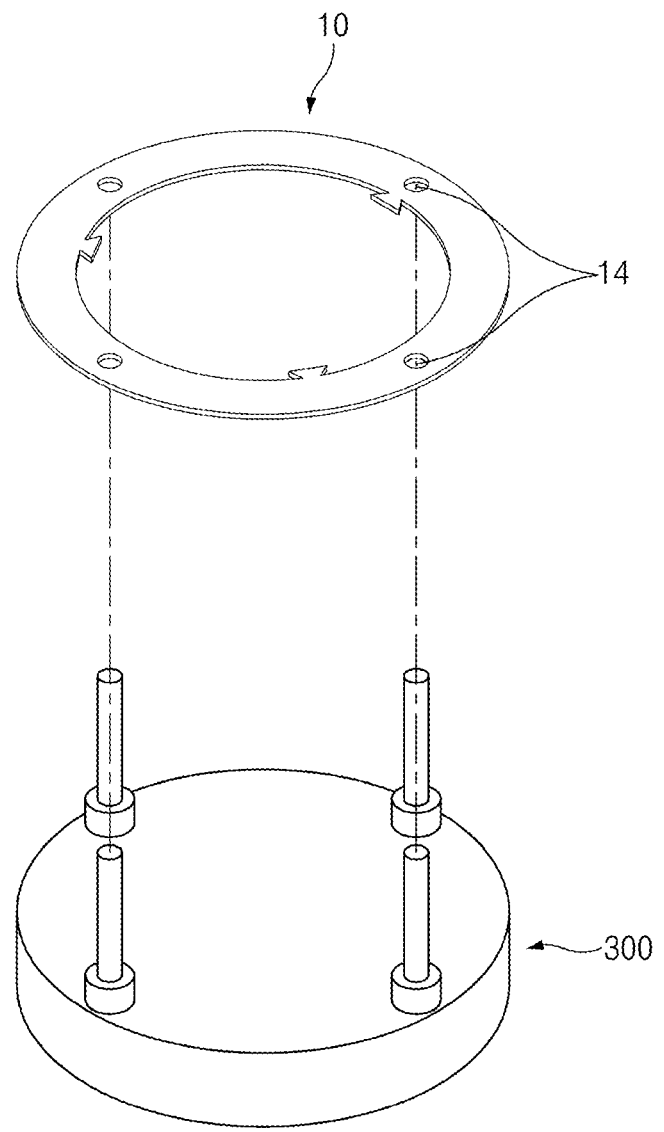
FIG. 8 is a perspective view illustrating an example of staking sleeve units having through-holes.
Figure 9:
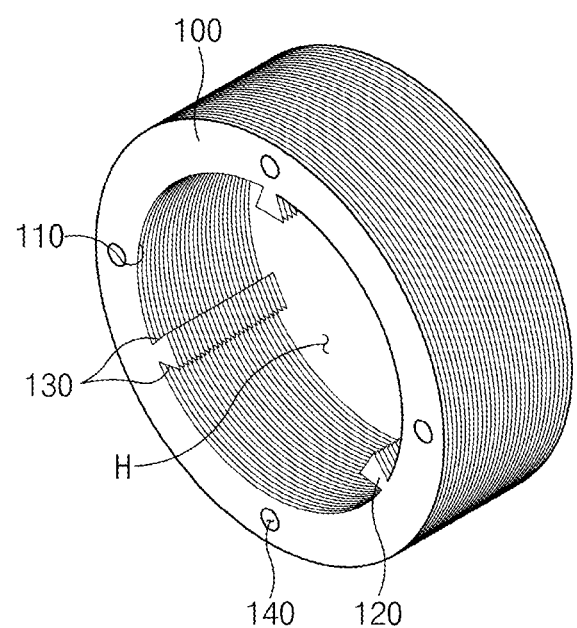
FIG. 9 is a perspective view illustrating an example of a sleeve having through-passages.

FIG. 8 illustrates a state, in which the sleeve unit 10 having through-holes 14 are stacked. FIG. 9 is a perspective view illustrating the sleeve having through-passages 140. The description of the sleeve unit 10 and the sleeve 100 of FIGS. 1 and 2 may be at least applied to the configurations other than the through-holes 14 and the through-passages 140.

The sleeve unit 10 may have the through-holes 14. For example, the plurality of through-holes 14 may be formed around the central hole "H". The through-holes 14 may be formed through a process including at least one of etching, laser cutting, and press cutting.

The sleeve 100 may be formed by stacking the plurality of sleeve units 10 while fitting the plurality of through-holes 14 with the plurality of rods included in a stacking jig 300.

The sleeve 100 may include the plurality of through-passages 140 that are formed in the axial direction of the hollow "H" around the hollow "H" such that a fluid (e.g., air) may flow therethrough.

Figure 10:
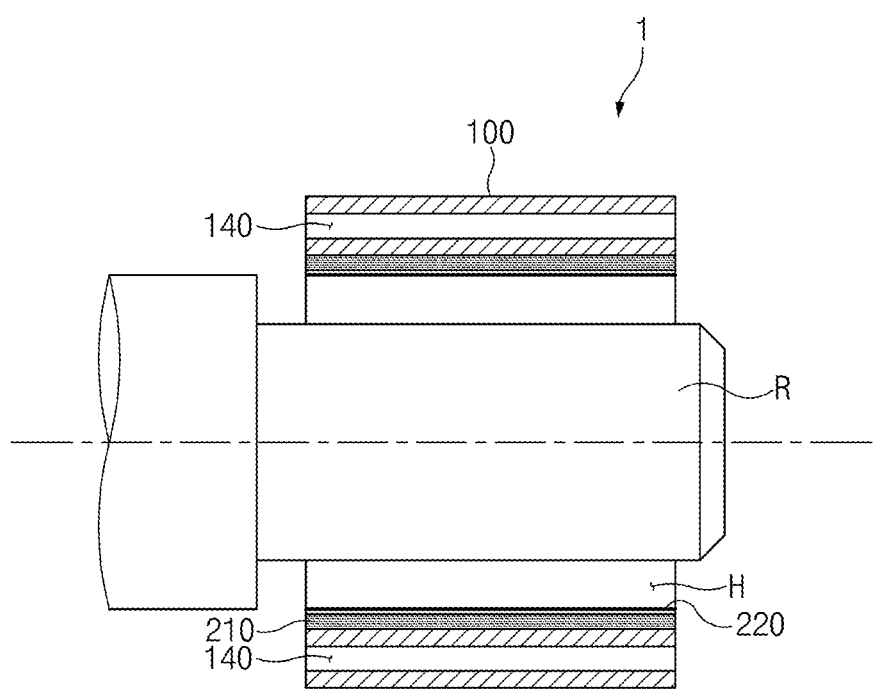
FIG. 10 is a side view illustrating an example of a rotor disposed in an example of an air foil bearing having through-passages.
Figure 11:
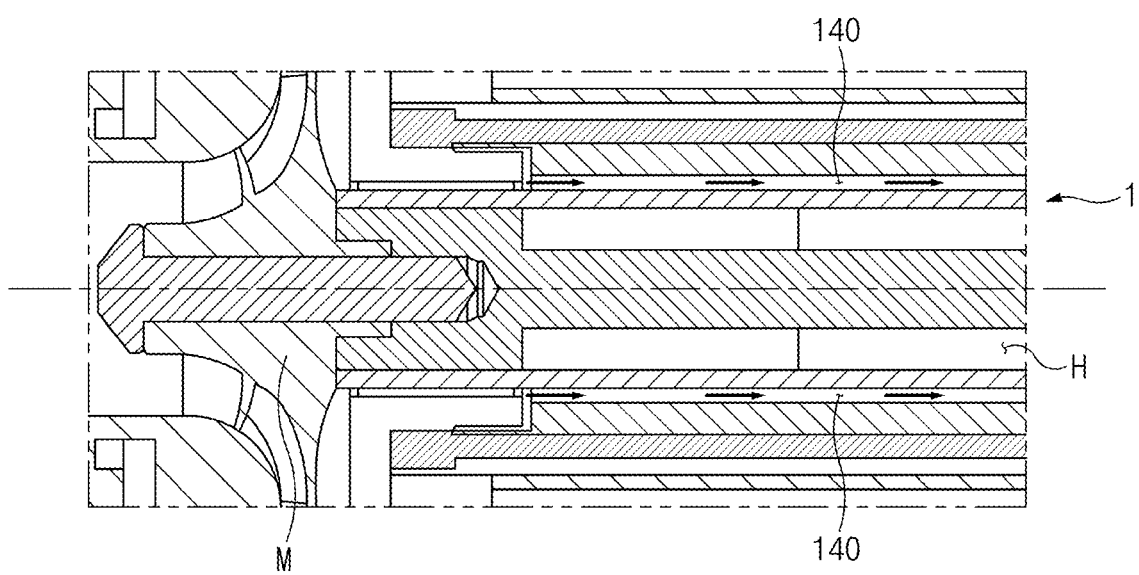
FIG. 11 is a side cross-sectional view illustrating an example of a disposition relationship of an air foil bearing having through-passages and an impeller.

FIG. 10 is a side view illustrating a state, in which the rotor "R" is disposed in the air foil bearing 1 having the through-passages 140. FIG. 11 illustrates a disposition relationship of the air foil bearing 1 having the through-passages 140 and an impeller.

As shown in FIG. 10, when the rotor "R" is installed to pass through the hollow "H" and is rotated, a temperature of an interior of the air foil bearing 1 may be increased by rotational heat. When the temperature of the air foil bearing 1 rises, the air foil bearing 1 itself is deformed, and thus the air foil bearing 1 may be damaged. Furthermore, an increase in the temperature of the interior of the air foil bearing 1 may decrease an ability to support the rotor "R".

As in FIG. 11, the impeller "M" may be disposed around the air foil bearing 1. The impeller "M", for example, may be a configuration of an air compressor that introduces exterior air into an interior of a fuel cell vehicle. Exterior air may be introduced into an interior of the fuel cell vehicle when the impeller "M" is rotated as a rotor of the air compressor is rotated. In this case, the impeller "M" or the rotor may secure driving stability and obtain a cooling effect due to the exterior air that flows into the air foil bearing 1. Furthermore, when the air foil bearing 1 includes the through-passages 140, the cooling effect may be maximized.

As described above, in addition to the cooling effect due to the circulated air that passes through the air film "A", the cooling effect of the air foil bearing 1 due to the fluid that passes through the through-passages 140 may be exhibited.

Figure 12:
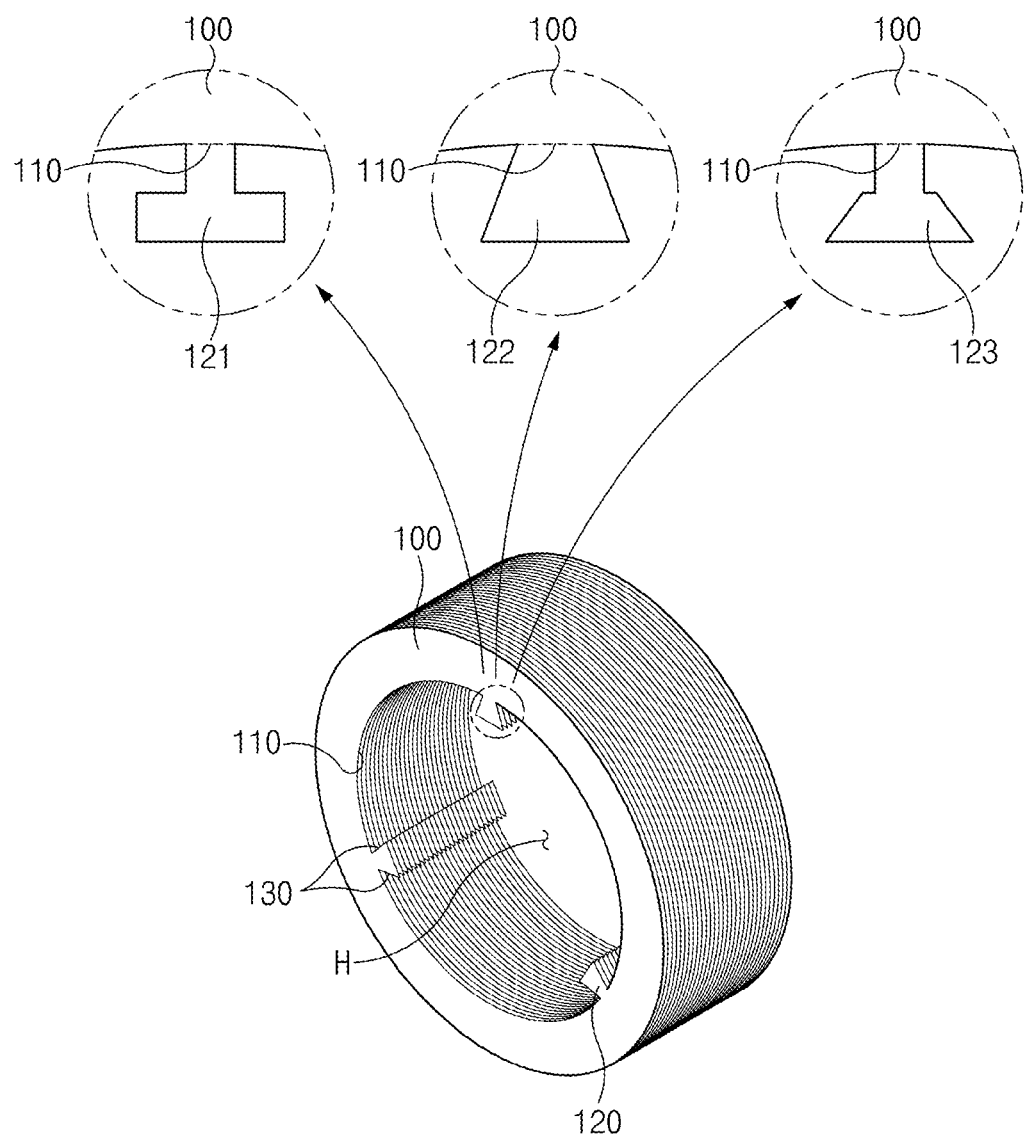
FIG. 12 is a view illustrating example shapes of a plurality of protrusions of a sleeve.

FIG. 12 is a view illustrating shapes of the plurality of protrusions 120 of the sleeve 100.

At least one of the plurality of protrusions 120 may have a shape that will be described below. When a width is defined along the inner peripheral surface 110 (e.g., an elliptical peripheral direction of the inner peripheral surface 110 when the hollow "H" has an elliptical column shape), a portion of at least one 121 of the plurality of protrusions 120, from the inner peripheral surface 110 to a specific protrusion height may have a first width and a portion thereof, which exceeds the specific protrusion height may have a second width that is larger than the first width.

When a width is defined along an elliptical peripheral direction of the inner peripheral surface (e.g., an elliptical peripheral direction of the inner peripheral surface 110 when the hollow "H" has an elliptical column shape), a portion of at least one of the plurality of protrusions 120, from the inner peripheral surface 110 to a specific protrusion height, may become larger as it becomes closer to a center of the hollow "H".

When a width is defined along an elliptical peripheral direction of the inner peripheral surface 110 (e.g., an elliptical peripheral direction of the inner peripheral surface 110 when the hollow "H" has an elliptical column shape), a portion of at least one 123 of the plurality of protrusions 120, from the inner peripheral surface to a specific protrusion height may have a specific width, and a width of a portion thereof, which exceeds the specific protrusion height, may be larger than the specific width and may become larger as it becomes closer to a center of the hollow "H".

A shape of at least one of the plurality of protrusions 120 is not limited to the above-described one, and may be variously implemented according to designs.

Figure 13:
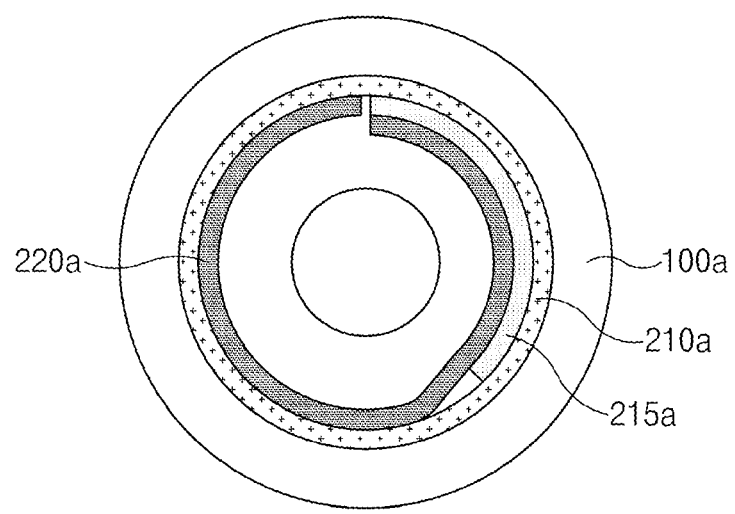
FIG. 13 is a view illustrating an example of a shim foil disposed in an example of an air foil bearing.

FIG. 13 is a view illustrating a state, in which a shim foil is disposed in the air foil bearing 1. The above description also may be applied to the present implementation in the same or similar way.

A bump foil 210a may be disposed on an inner peripheral surface of a sleeve 100a. A top foil 220a may be disposed on the bump foil 210a. The above description may be applied to a shape and driving stability that may be implemented by the bump foil 210a and the top foil 220a.

A shim foil 215a may be disposed between the bump foil 210a and the top foil 220a. In other words, the bump foil 210a and the top foil 220a may be stacked while the shim foil 215a being interposed therebetween. The shim foil 215a may be disposed to cover only a specific area of the inner peripheral surface of the sleeve 100a. Because the shim foil 215a is disposed between the bump foil 210a and the top foil 220a, the curvature of the top foil 220a may be variously implemented, and driving stability during rotation of the rotor may be enhanced. Parameters, such as a height, a size, and a disposition location of the shim foil 215a may be variously implemented according to designs.

In some implementations, a driving stability of the air foil bearing may be enhanced and thus a rotating body may be rotated while being supported stably.

In some implementations, a manufacturing easiness of the air foil bearing may be enhanced.

The above description is a simple exemplification of the technical spirits of the present disclosure, and the present disclosure may be variously corrected and modified by those skilled in the art to which the present disclosure pertains without departing from the essential features of the present disclosure. Accordingly, the implementations disclosed in the present disclosure is not provided to limit the technical spirits of the present disclosure but provided to describe the present disclosure, and the scope of the technical spirits of the present disclosure is not limited by the implementations. Accordingly, the technical scope of the present disclosure should be construed by the attached claims, and all the technical spirits within the equivalent ranges fall within the scope of the present disclosure.

What is claimed is:

1. An air foil bearing, comprising:
   a sleeve that defines a hollow portion having an irregular curvature, the hollow portion being configured to receive a rotor;
   a bump foil disposed at an inner peripheral surface of the sleeve; and
   a top foil disposed at the bump foil,
   wherein the bump foil supports the top foil, and
   wherein bump heights of the bump foil from at least two different positions of the inner peripheral surface are different from each other.

2. The air foil bearing of claim 1, wherein the top foil has an irregular curvature.

3. The air foil bearing of claim 1, wherein the bump heights of at least a portion of the bump foil decrease along a rotational direction of the rotor.

4. The air foil bearing of claim 1, wherein the top foil covers a portion of the bump foil between the two different positions of the inner peripheral surface of the sleeve, and
   wherein the irregular curvature of the top foil is defined based on the bump heights of the portion of the bump foil covered by the top foil.

5. The air foil bearing of claim 1, further comprising:
   a plurality of protrusions that protrude from the inner peripheral surface of the sleeve toward the hollow portion,
   wherein the bump foil is disposed at an area of the inner peripheral surface between at least two of the plurality of protrusions.

6. The air foil bearing of claim 5, wherein the plurality of protrusions divide the inner peripheral surface into a plurality of curved surfaces, and
   wherein at least two of the plurality of curved surfaces have curvatures different from each other.

7. The air foil bearing of claim 5, wherein the hollow portion has an elliptical column shape.

8. The air foil bearing of claim 7, wherein at least one of the plurality of protrusions defines:
   a first width at a first protrusion height from the inner peripheral surface; and
   a second width at a second protrusion height from the inner peripheral surface, the second protrusion height being greater than the first protrusion height, and the second width being greater than the first width, and
   wherein the first width and the second width are defined along an elliptical peripheral direction of the inner peripheral surface.

9. The air foil bearing of claim 7, wherein at least one of the plurality of protrusions defines:
   a first width at a first protrusion height from the inner peripheral surface; and
   a second width at a second protrusion height from the inner peripheral surface, the second protrusion height being greater than the first protrusion height, and the second width being greater than the first width,
   wherein the first width and the second width are defined along an elliptical peripheral direction of the inner peripheral surface, and
   wherein the second width increases as the at least one of the plurality of protrusions extends toward a center of the hollow portion.

10. The air foil bearing of claim 1, wherein the sleeve defines:
    a plurality of through-passages that extend in an axial direction of the rotor and are arranged around the hollow portion, the plurality of through-passages being configured to guide fluid therethrough.

11. An air foil bearing comprising:
    a sleeve that defines a hollow portion configured to receive a rotor;
    a bump foil disposed at an inner peripheral surface of the sleeve; and
    a top foil disposed at the bump foil,
    wherein the sleeve comprises a plurality of sleeve plates that are stacked in an axial direction of the rotor, each of the plurality of sleeve plates having a central hole to thereby define the hollow portion of the sleeve.

12. The air foil bearing of claim 11, wherein the central hole of each of the plurality of sleeve plates has an irregular curvature to thereby define an irregular curvature of the hollow portion.

13. The air foil bearing of claim 11, wherein bump heights of the bump foil from at least two different positions of the inner peripheral surface are different from each other.

14. The air foil bearing of claim 11, wherein each sleeve plate of the plurality of sleeve plates comprises:
    a plurality of bosses that protrude from an inner peripheral surface of the sleeve plate toward the central hole to thereby define recesses that accommodate the bump foil between the inner peripheral surface of the sleeve plate and the plurality of bosses.

15. The air foil bearing of claim 11, wherein each of the plurality of sleeve plates defines at least one through-hole spaced apart from the central hole, and
    wherein the sleeve includes at least one through-passage that extends through the at least one through-holes of the plurality of sleeve plates.

16. A method for manufacturing an air foil bearing, the method comprising:
    providing a plurality of sleeve plates, each of the plurality of sleeve plates having a central hole;
    staking the plurality of sleeve plates to thereby form a sleeve having a hollow portion configured to receive a rotor;
    disposing a bump foil at an inner peripheral surface of the sleeve; and
    disposing a top foil on the bump foil.

17. The method of claim 16, wherein providing the plurality of sleeve plates comprises:
    processing the plurality of sleeve plates by at least one of etching, laser cutting, or press cutting.

18. The method of claim 16, wherein staking the plurality of sleeve plates comprises:
    coupling the plurality of sleeve plates using at least one of an adhesive member, laser welding, or a rivet.

19. The method of claim 16, wherein providing the plurality of sleeve plates comprises defining a plurality of through-holes around the central hole of each of the plurality of sleeve plates, and
    wherein stacking the plurality of sleeve plates comprises fitting the plurality of through-holes of each of the plurality of sleeve plates with a plurality of rods included in a stacking jig.

* * * * *